United States Patent
Oh

(10) Patent No.: US 11,618,470 B2
(45) Date of Patent: Apr. 4, 2023

(54) SYSTEM FOR FORWARD COLLISION AVOIDANCE THROUGH SENSOR ANGLE ADJUSTMENT AND METHOD THEREOF

(71) Applicant: HYUNDAI MOBIS CO., LTD., Seoul (KR)

(72) Inventor: Jun Hyeong Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 7 days.

(21) Appl. No.: 17/344,145

(22) Filed: Jun. 10, 2021

(65) Prior Publication Data
US 2021/0394778 A1    Dec. 23, 2021

(30) Foreign Application Priority Data
Jun. 19, 2020   (KR) .................. 10-2020-0075123

(51) Int. Cl.
*B60Q 1/00* (2006.01)
*B60W 50/16* (2020.01)
*B60W 30/09* (2012.01)
*B60W 40/02* (2006.01)
*B60W 50/14* (2020.01)

(52) U.S. Cl.
CPC ............ *B60W 50/16* (2013.01); *B60W 30/09* (2013.01); *B60W 40/02* (2013.01); *B60W 2050/143* (2013.01); *B60W 2050/146* (2013.01); *B60W 2420/42* (2013.01); *B60W 2554/20* (2020.02); *B60W 2554/80* (2020.02)

(58) Field of Classification Search
CPC ...... B60W 50/16; B60W 30/09; B60W 40/02; B60W 2050/143; B60W 2050/146; B60W 2420/42; B60W 2554/20; B60W 2554/80; B60W 50/14; B60W 2554/4029; B60W 2710/18; B60W 2710/30; B60W 30/085; B60W 30/08; B60W 30/0956; B60W 10/18; B60W 40/10; B60R 21/0134; B60R 21/34; B60R 2021/0004; B60Y 2300/08

See application file for complete search history.

(56) References Cited

U.S. PATENT DOCUMENTS

| | | | |
|---|---|---|---|
| 7,102,496 B1 * | 9/2006 | Ernst, Jr. .......... | G08G 1/096725 340/436 |
| 10,843,687 B2 * | 11/2020 | Olsson .............. | B60W 30/0956 |
| 2021/0370890 A1 * | 12/2021 | Park ...................... | B60T 7/12 |
| 2021/0370921 A1 * | 12/2021 | Silva ................. | B60W 60/0027 |

FOREIGN PATENT DOCUMENTS

| KR | 10-2019-0007614 A | | 1/2019 | |
|---|---|---|---|---|
| WO | WO-2015147082 A1 | * | 10/2015 | ........... A01B 69/008 |
| WO | WO-2017079349 A1 | * | 5/2017 | ............ B60L 3/0007 |

* cited by examiner

*Primary Examiner* — Toan N Pham
(74) *Attorney, Agent, or Firm* — NSIP Law

(57) ABSTRACT

An apparatus and method for forward collision avoidance through sensor angle adjustment includes a position provider configured to provide information on a position of a host vehicle, a sensor configured to sense a presence of an object in vicinity of the host vehicle, and a vehicle controller configured to detect a dangerous area in a driving caution area, increase a sensitivity of the sensor toward the dangerous area, in response to detecting the dangerous area, and increase a forward collision avoidance performance of the host vehicle, in response to determining that the host vehicle enters the driving caution area through the position provider.

19 Claims, 4 Drawing Sheets

SYSTEM FOR FORWARD COLLISION AVOIDANCE THROUGH SENSOR ANGLE ADJUSTMENT AND METHOD THEREOF

CROSS-REFERENCE TO RELATED APPLICATION

This application claims the benefit under 35 U.S.C. § 119 (a) of Korean Patent Application No. 10-2020-0075123, filed on Jun. 19, 2020 in the Korean Intellectual Property Office, the entire contents of which are incorporated herein by reference for all purposes.

BACKGROUND

1. Field

The present disclosure relates to a system for forward collision avoidance through sensor angle adjustment and a method thereof, and more particularly, to a system for forward collision avoidance through sensor angle adjustment and a method thereof, capable of more rapidly coping with the collision with a pedestrian or rushed out between parked and stopped vehicles by changing a parameter of the system for forward collision avoidance of the vehicle, when a vehicle passing a low speed limit area recognizes the parked or stopped vehicle.

2. Description of Related Art

In general, a driver may face a number of unexpected dangerous situations during driving due to reasons, such as drowsy driving, inexperienced driving, violent driving, and road conditions, of the driver or another person.

Accordingly, Advanced Driver Assistance Systems (ADAS) have been developed to assist driving safety by allowing the vehicle to determine some of the dangerous situations that occur during driving.

For example, among ADAS technologies, lane following assist (LFA), lane keeping assist (LKA), and Forward Collision Avoidance Assist (FCA), which are also applied to an autonomous vehicle, are functions to assist a driver to more safely drive the vehicle.

Among them, the FCA is a driving safety system that warns the driver of danger and controls the braking of the vehicle to prevent the collision with an obstacle in front of the vehicle during driving.

However, a typical FCA has to find out an appropriate value between malfunction and non-operation. When a relevant parameter is set to be excessively sensitive, the malfunction may be caused. To the contrary, when the relevant parameter is set to be slightly sensitive, the non-operation may be caused.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for forward collision avoidance, the apparatus including a position provider configured to provide information on a position of a host vehicle, a sensor configured to sense a presence of an object in vicinity of the host vehicle, and a vehicle controller configured to detect a dangerous area in a driving caution area, increase a sensitivity of the sensor toward the dangerous area, in response to detecting the dangerous area, and increase a forward collision avoidance performance of the host vehicle, in response to determining that the host vehicle enters the driving caution area through the position provider.

The vehicle controller may be configured to sense that the host vehicle enters a low speed limit area, through the position provider.

The vehicle controller may be configured to sense a parked or stopped vehicle in the driving caution area, through the sensor, and set, as the dangerous area, an area in which a distance between parked or stopped vehicles is less than a threshold.

The vehicle controller may be configured to change a sensing direction of the sensor to face the dangerous area, and increase a sensitivity of the sensor, in response to the dangerous area being set.

The vehicle controller may be configured to change braking force of the host vehicle or a time point to brake the host vehicle, in response to setting the dangerous area.

The vehicle controller may be configured to provide audio-visual information or tactile information to a driver of the host vehicle, in response to sensing a moving object including a pedestrian in the dangerous area.

The vehicle controller may be configured to change a sensing direction of the sensor to face the dangerous area, in response to detecting the dangerous area.

In response to detecting the host vehicle deviating from the driving caution area, the vehicle controller may be configured to restore the sensing direction of the sensor to an original direction, and restore the sensitivity of the sensor to original sensitivity.

In another general aspect, there is provided a processor-implemented method for forward collision avoidance, the method including sensing that the host vehicle enters a driving caution area, through a position provider providing information on a position of the host vehicle, detecting a dangerous area in a driving caution area, through a sensor sensing a presence of an object in vicinity of the host vehicle, increasing, by a vehicle controller, sensitivity of the sensor toward the dangerous area, and increasing a forward collision avoidance performance of the host vehicle, in response to the detecting of the dangerous area.

The sensing of the host vehicle entering the driving caution area may include sensing that the host vehicle enters a low speed limit area, through the position provider.

The detecting of the dangerous area in the driving caution area may include sensing a parked or stopped vehicle in the driving caution area, through the sensor, and setting, as the dangerous area, an area in which a distance between parked or stopped vehicles is less than a threshold.

The increasing of the sensitivity of the sensor, and the increasing of the forward collision avoidance performance of the host vehicle may include changing a sensing direction of the sensor to face the dangerous area, and increasing a sensitivity of the sensor, in response to the dangerous area being set.

The increasing of the sensitivity of the sensor, and the increasing of the forward collision avoidance performance of the host vehicle may include changing braking force of the host vehicle or a time point to brake the host vehicle, in response to setting the dangerous area.

The method may include providing audio-visual information or tactile information to a driver of the host vehicle, in response to sensing a moving object including a pedestrian in the dangerous area.

In response to detecting the host vehicle deviating from the driving caution area, the method may include restoring the sensing direction of the sensor to an original direction, and restoring the sensitivity of the sensor to original sensitivity.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
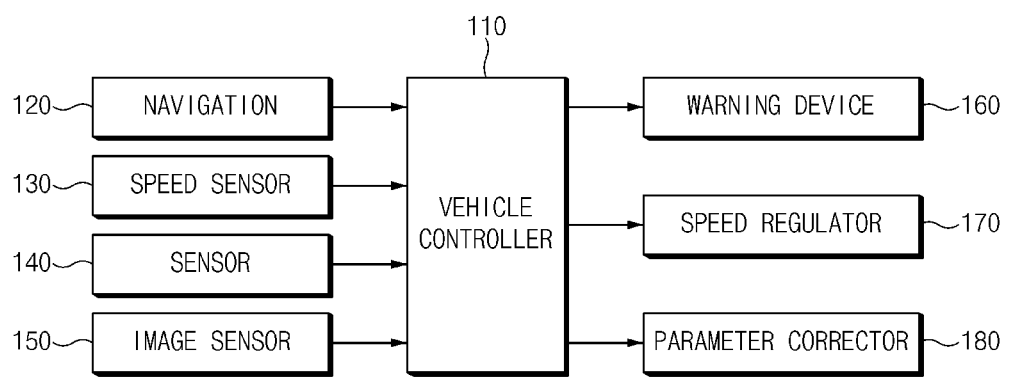
FIG. 1 is a block diagram illustrating a system for forward collision avoidance through sensor angle adjustment, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 3 in detail.

Figure 2:
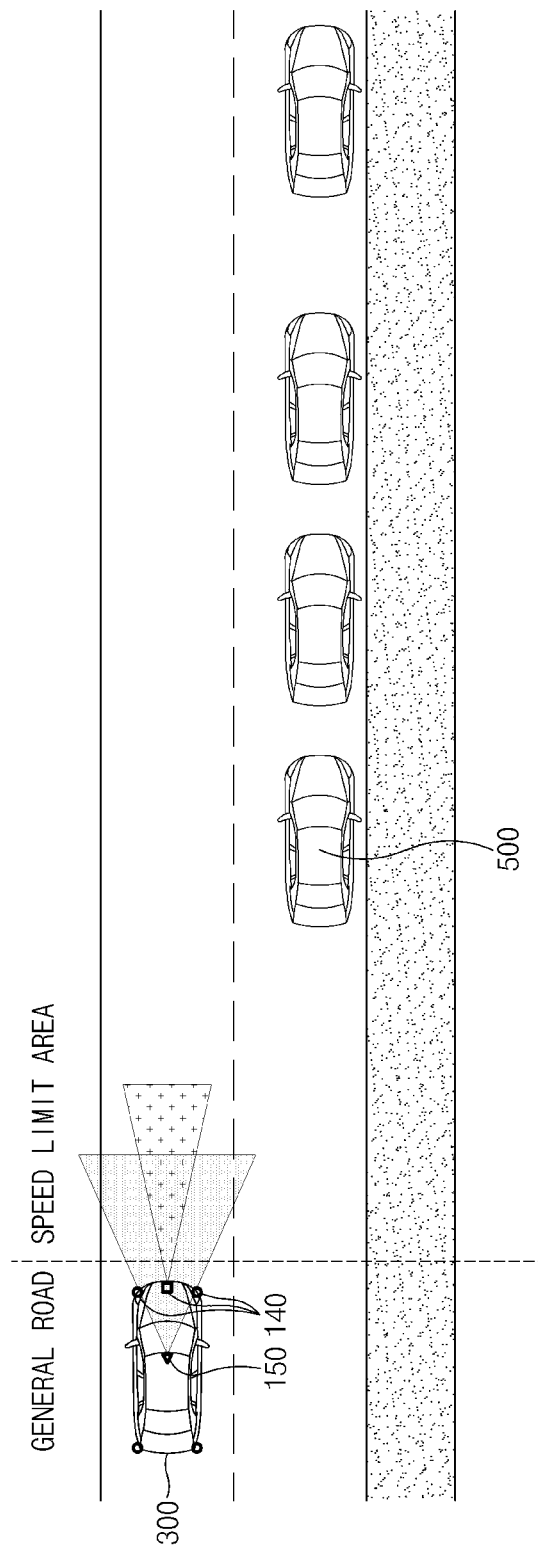
FIGS. 2 and 3 are views illustrating an operating procedure by using a system for forward collision avoidance through sensor angle adjustment, according to an embodiment of the present disclosure.
Figure 3:
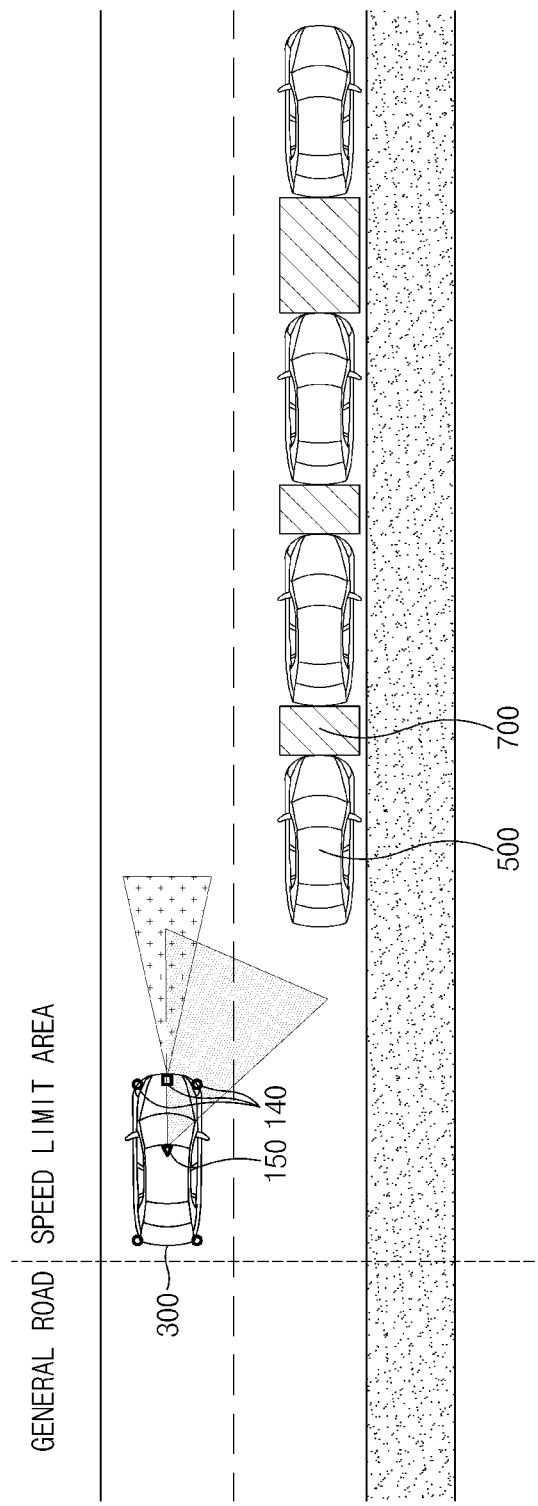

FIG. 1 is a block diagram illustrating a system for forward collision avoidance (FCA) through sensor angle adjustment, according to an embodiment of the present disclosure, and FIGS. 2 and 3 are views illustrating an operating procedure by using a system for forward collision avoidance through sensor angle adjustment, according to an embodiment of the present disclosure.

Referring to FIGS. 1 and 2, a system for forward collision avoidance through sensor angle adjustment, according to an embodiment of the present disclosure may include a vehicle controller 110, a navigation 120, a speed sensor 130, a sensor 140, an image sensor 150, a warning device 160, a speed regulator 170, and a parameter corrector 180.

The navigation 120, which includes a GPS receiver to provide information on a current position of a host vehicle 300 to the vehicle controller 110, may provide, to the vehicle controller 110, information on whether the host vehicle 300 is positioned on a general road or a low speed limit area, such as a child protection zone or a school zone.

The speed sensor 130 includes a wheel sensor to sense a driving speed of the host vehicle 300. The speed sensor 130 may sense the rotating speed of the wheel of the host vehicle 300 and may provide information on the rotating speed to the vehicle controller 110.

The sensor 140 may include a LiDAR sensor, an ultrasonic sensor, or a radar sensor. The sensor 140 may be installed at a left side portion, a right side portion, a front portion, a rear portion, a front-left portion, a front-right portion, a rear-left portion or a rear-right portion of the host vehicle 300 to sense whether another vehicle is present or approaches the host vehicle 300, or whether a pedestrian approaches the host vehicle 300, and to provide the information on the sensing to the vehicle controller 110.

The sensor 140 may be provided at the side portion of the host vehicle 300 to sense whether a vehicle is parked or stopped on the shoulder of a road or whether a pedestrian is present, and may be provided at the front portion of the host vehicle 300 to sense a vehicle or a pedestrian positioned in front of the host vehicle 300.

The image sensor 150 may include a camera, and may be installed in any place, such as a vicinity of a rear view mirror of the host vehicle 300, positioned to obtain information on an image of an inner portion or an outer portion of the host vehicle 300 by taking the image.

The image sensor 150 may take an image of a vicinity of the host vehicle 300 while the host vehicle 300 is travelling or being stopped and may provide information, which is obtained by sensing the vehicle or the pedestrian, to the vehicle controller 110. The image sensor 150 may photograph a vehicle which is parked or stopped on the shoulder of the road, a pedestrian positioned on a sidewalk, or a vehicle or a pedestrian positioned in front of the host vehicle 300. In addition, the image sensor 150 may photograph an object, which is moving, or various obstacles which are stationary.

The warning device 160 may provide, to a driver of the host vehicle 300, audio-visual information or tactile information, when a control signal is received from the vehicle controller 110, as it is determined that the host vehicle 300 enters the low speed limit area based on the information of the navigation 120. When the control signal is received from the vehicle controller 110, as a dangerous area 700 is present due to parked or stopped vehicles in the low speed limit area, the warning device 160 may provide, to the driver of the host vehicle 300, the audio-visual information or the tactile information.

The warning device 160 may be configured to include a vibration device, a display, or a sound device.

The vibration device, which vibrates an object to be vibrated by using a vibration motor or an electromagnet, and is provided inside of spokes of a steering wheel or the steering wheel to vibrate the spoke of the steering wheel or the steering wheel.

The display, which outputs a warning message to a screen, may be provided on a display device or a dash board.

The display may output mutually different warning messages depending on a control signal and may provide the mutually different warning messages to the driver. For example, when the host vehicle 300 enters the low speed limit area, the display may output a message on the low speed limit area. When the dangerous area 700 is present, the display may output a message on the dangerous area 700.

The sound device, which outputs a warning message or a warning sound in the form of a sound, may output the warning message by using a voice of a person, which is recorded in advance, and the type of the warning sound may be changed depending on the selection of a designer or a driver.

The sound device may output the warning message or the warning sound by using a speaker provided in the host vehicle 300 or a speaker provided in the display device. The sound device may output mutually different warning messages in response to a control signal.

The speed regulator 170 may regulate the speed of the host vehicle 300 and may include an accelerator driving part and a brake driving part.

The speed regulator 170 may regulate a driving speed of the host vehicle 300 under the control of the vehicle controller 110. The speed regulator 170 may reduce the driving speed of the host vehicle 300 or stop the host vehicle 300, when the risk of collision between the host vehicle 300 and another object is high.

The parameter corrector 180 may be a forward collision-avoidance assist (FCA) controller, may increase the sensitivity of the sensor 140 and the image sensor 150, and may change the sensing direction of the image sensor 150.

Accordingly, when the dangerous area 700 is present, the sensing direction of the image sensor 150 may be changed to face a place in which the dangerous area 700 is positioned, under the control of the vehicle controller 110. In addition, the sensitivity of the sensor 140 may be increased to be higher such that a time point to brake the host vehicle 300 becomes earlier and force (braking force) for braking the host vehicle 300 becomes stronger, when an object is present in front of the host vehicle 300.

The vehicle controller 110 may include an electronic control unit (ECU). When sensing that the host vehicle 300 enters the low speed limit area, through the navigation 120, the vehicle controller 110 may transmit a control signal to the warning device 160 and may notify the driver of the host vehicle 300 of that the host vehicle 300 enters the low speed limit area.

When the host vehicle 300 enters the low speed limit area, the vehicle controller 110 may control the speed regulator 170 to reduce the speed of the host vehicle 300 to a speed specified for the low speed limit area.

The vehicle controller 110 may sense whether the parked or stopped vehicle is present on the shoulder of the road, through the sensor 140. When it is sensed that parked or stopped vehicles are consecutively present, the vehicle controller 110 may detect the distance between the parked or stopped vehicles.

When the distance between the parked or stopped vehicles is less than a specific distance or threshold, the vehicle controller 110 may define, as the dangerous area 700, an area in which the distance between the parked or stopped vehicles is less than the specific distance or the threshold.

The vehicle controller 110 may notify the driver of the host vehicle 300 of that the dangerous area 700 is present, through the warning device 160, as the dangerous area 700 is present due to the parked or stopped vehicles in the low speed limit area.

The vehicle controller 110 may control the parameter corrector 180 such that the photographing direction of the image sensor 150 faces the dangerous area 700, and the sensitivity of the sensor 140 may be corrected to be higher, as the dangerous area 700 is present.

The image sensor 150 faces the dangerous area 700. Accordingly, when a pedestrian is positioned in the dangerous area 700 to enter the road from the sidewalk, the vehicle controller 110 may more rapidly recognize the pedestrian. In addition, since the sensitivity of the sensor 140 is in a higher level, when another vehicle or the pedestrian is present in front of the host vehicle, the time point to brake the host vehicle 300 becomes earlier and the braking force of the host vehicle 300 becomes stronger, thereby preventing the collision with the vehicle or the pedestrian positioned in front of the host vehicle 300.

When sensing that the host vehicle 300 deviates from the low speed limit area through the navigation 120, the vehicle controller 110 may restore the direction, which faces the dangerous area 700, of the image sensor 150 to an original direction, and may restore the sensitivity of the sensor 140 to the original sensitivity.

Figure 4:
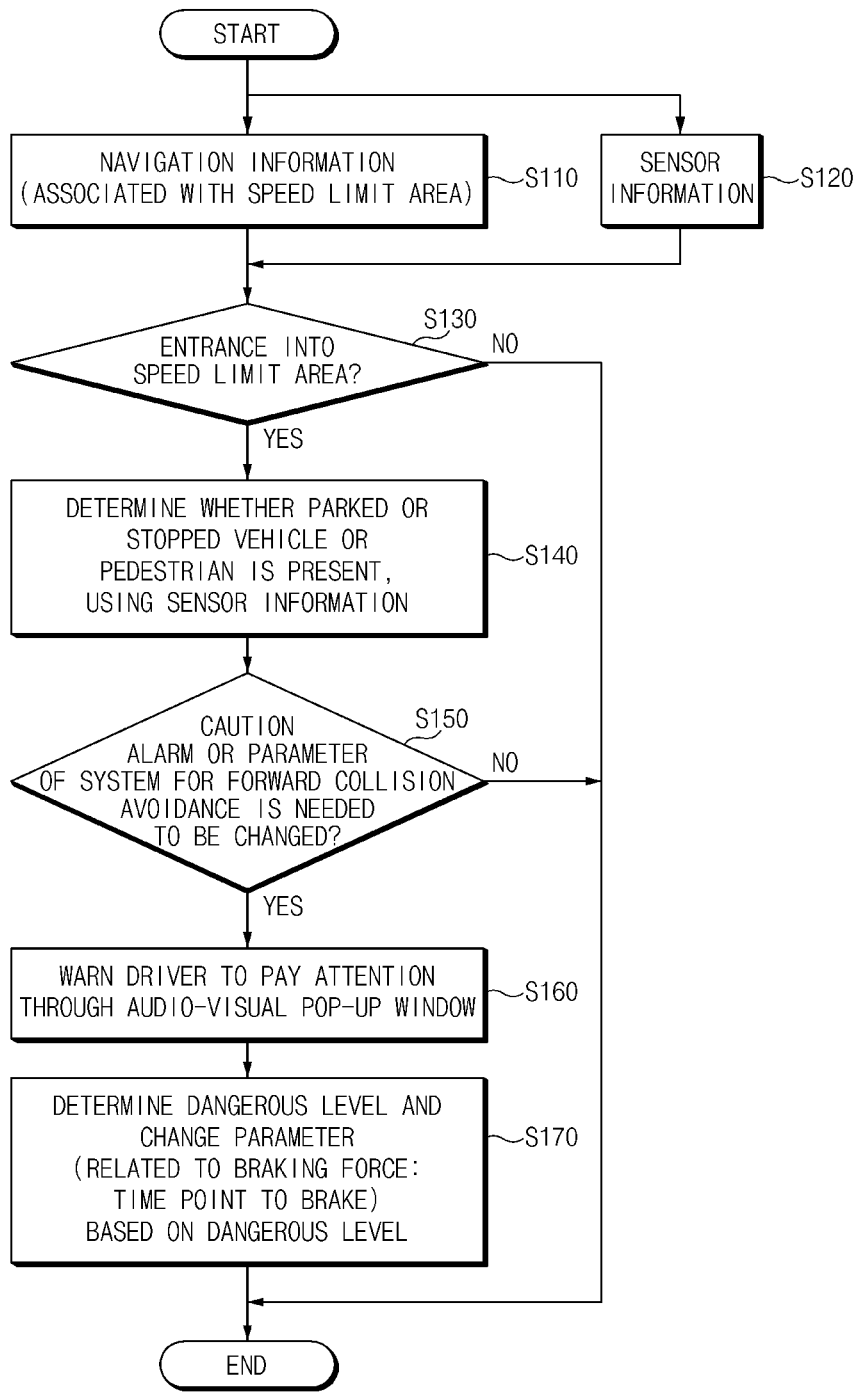
FIG. 4 is a flowchart illustrating a method for forward collision avoidance through sensor angle adjustment, according to an embodiment of the present disclosure.

Hereinafter, a method for forward collision avoidance through sensor angle adjustment, according to another embodiment of the present disclosure will be described with reference to FIG. 4. FIG. 4 is a flowchart illustrating a method for forward collision avoidance through sensor angle adjustment, according to another embodiment of the present disclosure.

Hereinafter, it is assumed that the system for the forward collision avoidance through the sensor angle adjustment of FIG. 1 performs a processor of FIG. 4.

First, the vehicle controller 110 may sense that the host vehicle 300 enters the low speed limit area, through the navigation 120 (S110 and S130), and may sense whether the parked or stopped vehicle is present on the shoulder of the road, through the sensor 140 (S120).

Thereafter, when the consecutively parked or stopped vehicle is sensed, the distance between the parked or stopped may be detected. When the distance between the parked or stopped is less than the specific distance, an area, in which the distance between the parked or stopped is less than the specific distance, may be defined as the dangerous area 700 (S140).

As the dangerous area 700 is present (S150), the vehicle controller 110 may notify a driver of the host vehicle 300 of that the dangerous area 700 is present, through the warning device 160 (S160).

Next, the vehicle controller 110 may control the parameter corrector 180 such that the photographing direction of the image sensor 150 faces the dangerous area and may correct the sensitivity of the sensor 140 to be higher (S170).

Since the image sensor 150 is provided to face the direction of the dangerous area 700, when the pedestrian is positioned in the dangerous area 700 to enter the road from the sidewalk, the vehicle controller 110 may more rapidly recognize the pedestrian. In addition, since the sensitivity of the sensor 140 is in a higher level, when another vehicle or the pedestrian is present in front of the host vehicle 300, the vehicle controller 110 may change the time point to brake the host vehicle 300 to be earlier and change the braking force to be stronger, thereby preventing the collision with the another vehicle or the pedestrian positioned in front of the host vehicle 300.

Thereafter, when sensing that the host vehicle 300 deviates from the low speed limit area, through the navigation 120, the vehicle controller 110 may restore the direction of the image sensor 150, which faces the dangerous area 700, to an original direction and may restore the sensitivity of the sensor 140 to original sensitivity.

As described above, according to the present disclosure, the dangerous level may be defined with respect to when a parked or stopped vehicle is present or a pedestrian is recognized on a sidewalk during driving the low speed limit area, such that audio-visual information or tactile information is provided to a driver. Accordingly, when the parked or stopped vehicles are consecutively aligned, the dangerous area between parked or stopped vehicles consecutively aligned may be intensively detected by adjusting the sensor angle using dualized parameters (related to collision determination and braking) of the forward collision avoidance assist function, thereby rapidly coping with the collision with the pedestrian rushed out between parked or stopped vehicles or rushed to the road out of the sidewalk, to reduce the collision with the pedestrian in the situation that many parked and stopped vehicles are present in the low speed limit area and to reduce the burden of the driver by enhancing a collision avoidance function in the low speed limit area.

An aspect of the present disclosure is to provide a system for forward collision avoidance through sensor angle adjustment and a method thereof, in which a dangerous level is defined with respect to when a parked or stopped vehicle is present or a pedestrian is recognized on a sidewalk during driving a low speed limit area, such that audio-visual information or tactile information is provided to a driver. Accordingly, when the parked or stopped vehicles are consecutively aligned, a dangerous area between parked or stopped vehicles consecutively aligned is intensively detected by adjusting the sensor angle using dualized parameters (related to collision determination and braking) of the forward collision avoidance assist function, thereby rapidly coping with the collision with the pedestrian rushed out between parked or stopped vehicles or rushed to the road out of the sidewalk, to reduce the collision with the pedestrian in the situation that many parked and stopped vehicles are present in the low speed limit area and to reduce the burden of the driver by enhancing a collision avoidance function in the low speed limit area.

As described above, the dangerous level may be defined with respect to when a parked or stopped vehicle is present or a pedestrian is recognized on a sidewalk during driving the low speed limit area, such that audio-visual information or tactile information is provided to a driver. Accordingly, when the parked or stopped vehicles are consecutively aligned, the dangerous area between parked or stopped vehicles consecutively aligned may be intensively detected by adjusting the sensor angle using dualized parameters (related to collision determination and braking) of the forward collision avoidance assist function, thereby rapidly coping with the collision with the pedestrian rushed out between parked or stopped vehicles or rushed to the road out of the sidewalk, to reduce the collision with the pedestrian in the situation that many parked and stopped vehicles are present in the low speed limit area and to reduce the burden of the driver by enhancing a collision avoidance function in the low speed limit area.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for forward collision avoidance, the apparatus comprising:
   a position provider configured to provide information on a position of a host vehicle;
   a sensor configured to sense a presence of an object in vicinity of the host vehicle; and
   a vehicle controller configured to:
      detect a dangerous area in a driving caution area;
      increase a sensitivity of the sensor toward the dangerous area, in response to detecting the dangerous area; and
      increase a forward collision avoidance performance of the host vehicle, in response to determining that the host vehicle enters the driving caution area through the position provider.

2. The apparatus of claim 1, wherein the vehicle controller is further configured to:
   sense that the host vehicle enters a low speed limit area, through the position provider.

3. The apparatus of claim 1, wherein the vehicle controller is further configured to:
   sense a parked or stopped vehicle in the driving caution area, through the sensor; and
   set, as the dangerous area, an area in which a distance between parked or stopped vehicles is less than a threshold.

4. The apparatus of claim 3, wherein the vehicle controller is further configured to:
   change a sensing direction of the sensor to face the dangerous area; and
   increase a sensitivity of the sensor, in response to the dangerous area being set.

5. The apparatus of claim 3, wherein the vehicle controller is further configured to:
   change braking force of the host vehicle or a time point to brake the host vehicle, in response to setting the dangerous area.

6. The apparatus of claim 1, wherein the vehicle controller is further configured to:
   provide audio-visual information or tactile information to a driver of the host vehicle, in response to sensing a moving object including a pedestrian in the dangerous area.

7. The apparatus of claim 1, wherein the vehicle controller is further configured to:
   change a sensing direction of the sensor to face the dangerous area, in response to detecting the dangerous area.

8. The apparatus of claim 7, wherein in response to detecting the host vehicle deviating from the driving caution area, the vehicle controller is further configured to:
   restore the sensing direction of the sensor to an original direction; and
   restore the sensitivity of the sensor to original sensitivity.

9. A processor-implemented method for forward collision avoidance, the method comprising:

sensing that host vehicle enters a driving caution area, through a position provider providing information on a position of the host vehicle;

detecting a dangerous area in a driving caution area, through a sensor sensing a presence of an object in vicinity of the host vehicle;

increasing, by a vehicle controller, sensitivity of the sensor toward the dangerous area; and increasing a forward collision avoidance performance of the host vehicle, in response to the detecting of the dangerous area.

10. The method of claim 9, wherein the sensing of the host vehicle entering the driving caution area comprises:

sensing that the host vehicle enters a low speed limit area, through the position provider.

11. The method of claim 9, wherein the detecting of the dangerous area in the driving caution area comprises:

sensing a parked or stopped vehicle in the driving caution area, through the sensor; and setting, as the dangerous area, an area in which a distance between parked or stopped vehicles is less than a threshold.

12. The method of claim 11, wherein the increasing of the sensitivity of the sensor, and the increasing of the forward collision avoidance performance of the host vehicle comprises:

changing a sensing direction of the sensor to face the dangerous area; and increasing a sensitivity of the sensor, in response to the dangerous area being set.

13. The method of claim 11, wherein the increasing of the sensitivity of the sensor, and the increasing of the forward collision avoidance performance of the host vehicle comprises:

changing braking force of the host vehicle or a time point to brake the host vehicle, in response to setting the dangerous area.

14. The method of claim 9, further comprising:

providing audio-visual information or tactile information to a driver of the host vehicle, in response to sensing a moving object including a pedestrian in the dangerous area.

15. The method of claim 9, wherein in response to detecting the host vehicle deviating from the driving caution area, further comprising:

restoring sensing direction of the sensor to an original direction; and restoring the sensitivity of the sensor to original sensitivity.

16. A non-transitory computer-readable storage medium storing instructions that, when executed by a processor, cause the processor to perform the method of claim 9.

17. An apparatus for forward collision avoidance, the apparatus comprising:

a sensor configured to sense a presence of an object in vicinity of a host vehicle; and a vehicle controller configured to:

detect a dangerous area in a driving caution area; and increase a sensitivity of the sensor toward the dangerous area, in response to detecting the dangerous area.

18. The apparatus of claim 17, further comprising a position provider configured to provide position information of the host vehicle, wherein the driving caution area is determined based on the position information.

19. The apparatus of claim 17, wherein the vehicle controller is further configured to increase a forward collision avoidance performance of the host vehicle, in response to determining that the host vehicle enters the driving caution area.

* * * * *